Figure 1:
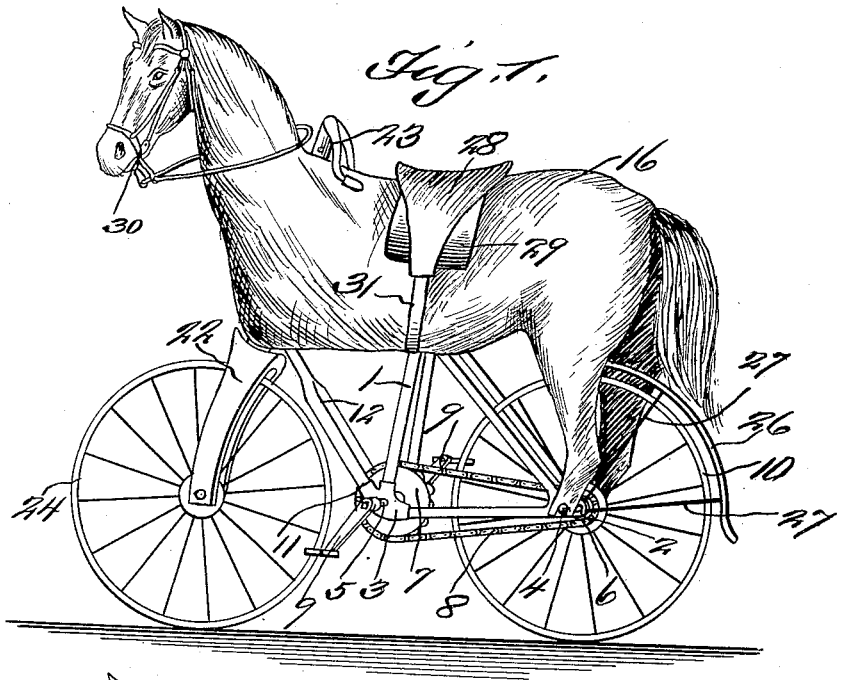

O. J. JACKSON.
TOY CYCLE.
APPLICATION FILED APR. 17, 1912.

1,042,682.

Patented Oct. 29, 1912.
2 SHEETS—SHEET 1.

Witnesses
Francis G. Boswell,
C. E. Clements,

Inventor
O. J. Jackson,
By D. Swift & Co.
Attorneys

COLUMBIA PLANOGRAPH CO., WASHINGTON, D. C.

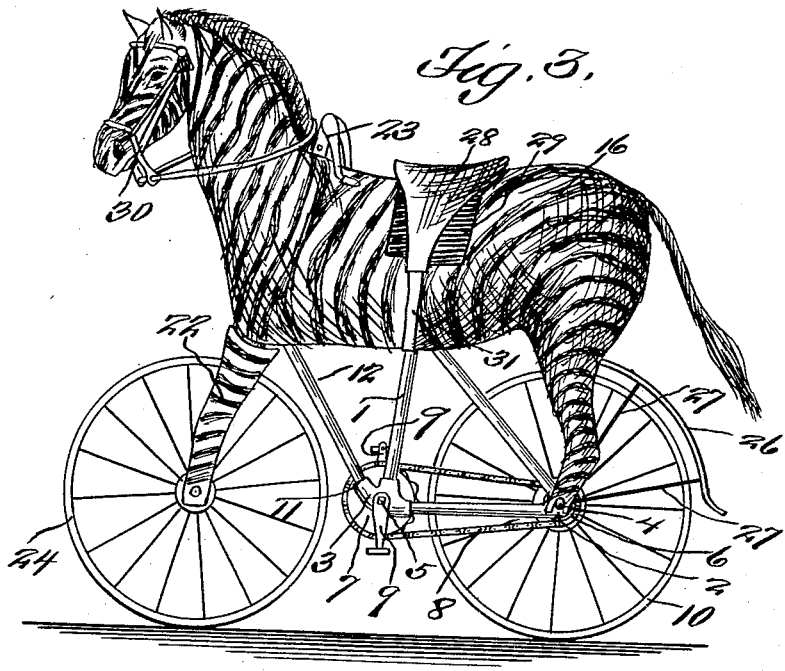

UNITED STATES PATENT OFFICE.

OKEY J. JACKSON, OF CANFIELD, WEST VIRGINIA.

TOY CYCLE.

1,042,682.  Specification of Letters Patent.  Patented Oct. 29, 1912.

Application filed April 17, 1912. Serial No. 691,368.

*To all whom it may concern:*

Be it known that I, OKEY J. JACKSON, a citizen of the United States, residing at Canfield, in the county of Braxton and State of West Virginia, have invented a new and useful Toy Cycle; and I do hereby declare the following to be a full, clear, and exact description of the invention, such as will enable others skilled in the art to which it appertains to make and use the same.

This invention relates to a new and useful toy.

It is the object of the invention to provide a novel form of toy in the design of a bicycle having a body of a horse applied thereto.

Another object of the invention is the provision of a device of this nature having novel features of construction.

One of the features of the construction is to apply the horse's body to the bicycle in such wise as to permit the same to be removed, in order to readily permit another body of an animal, such as a mule, zebra, or camel or the like, to be substituted.

Another feature of the invention is the provision of means for drawing the front and rear upper portions of the bicycle frame together, in order to hold the body of the animal steady and firm.

The invention comprises further features and combination of parts, as hereinafter set forth, shown in the drawings and claimed.

Figure 2:
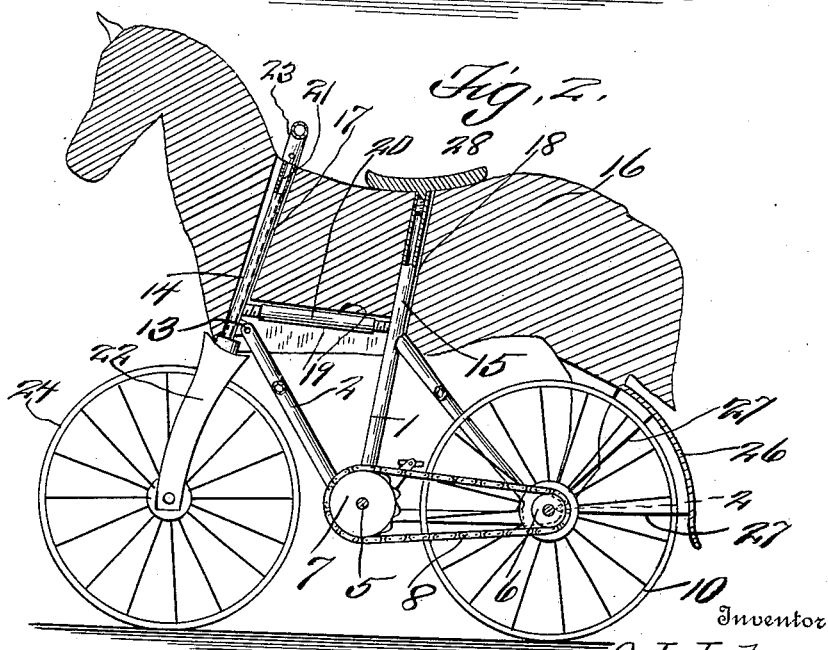

In the drawings:—Figure 1 is a view in side elevation of a bicycle constructed in accordance with the invention. Fig. 2 is a sectional view. Fig. 3 is a view similar to Fig. 1 showing the bicycle applied to the different form of body. Figs. 4 and 5 are detail views.

Referring to the drawings 1 designates the frame of the bicycle, which is substantially diamond shaped in elevation. Journaled in bearings 2 and 3 of the frame 1 are the rear and forward axles 4 and 5. The rear axle is provided with a sprocket wheel 6, while the forward axle is supplied with a similar wheel 7 of larger diameter. Passing about the sprocket wheels 6 and 7 is a chain 8, by which power is transmitted to the rear axle. The forward axle has connected to it the usual cranking pedals 9, for rotating the axle 5. Movable with the rear axle 4 is the usual bicycle wheel 10. Hinged at 11 to the frame 1 is a bar 12, which connects at 13 to the tube 14. The frame 1 terminates in a substantially upwardly arranged post 15. The body 16 representing that of a horse or the like is provided with two substantially parallel bores 17 and 18.
The bore 17 receives the tube 14, while the bore 18 receives the post 15. The body 16 is provided with a cutaway portion 19, to receive the tube 20. This tube 20 connects the tube 14 and the post 15, in such a manner as to draw the tube and post toward one another to thereby firmly hold the body 16 in position. A rod 21, the lower end of which terminates in forks 22, passes through the tube 14, and to its upper end the handle bars 23 are connected, for steering the front wheel 24 of the bicycle. The front wheel is journaled in the forks 22, in the usual manner. The front forks are broader at the upper portion than their lower portion, in order to somewhat represent a pair of animal's legs. The rear legs of the body 16 terminate with the recesses, to receive the rear axles 4. Projecting from the rear of the body is a wheel guard 26, which is braced relative to the frame 1 by the rods 27. The saddle 28 having the saddle bags 29, is threaded to the post 15, and assists in holding the body 16 in place. The bridle 30 and the girth 31 are painted on the body 16 as shown in Fig. 2.

From the foregoing it will noted, there has been devised a novel form of toy, and one which has been found practical.

The invention having been set forth, what is claimed as new and useful is:—

1. In combination, a bicycle frame including the usual wheels and propelling mechanism, the frame having a substantially vertical post, a forward tubular member having a hinged connecting member with the frame, an animal's body having two substantially parallel bores, one to receive the post, and the other to receive the tubular member, and a connecting tube for drawing the post and the tubular member toward one another, and a steering rod mounted in the tubular member and terminating at its lower end in forks and at its upper end in handle bars.

2. In combination, a bicycle frame having bicycle wheels and propelling mechanism, the frame having a substantially vertical post, a forward tubular member having a hingedly connecting member with the frame, a body having two substantially parallel bores and provided with a cutaway portion adjoining the bores, one bore adapted to receive the post, while the other receives the forward tubular member, a connecting tube arranged in the cutaway portion and adjustably connecting the tubular member and the post, a steering rod journaled in the forward tubular member and terminating at its lower end in forks to receive the front bicycle wheel, handle bars mounted on the upper end of the steering rod, and a saddle including saddle bags mounted on the upper end of the post.

In testimony whereof I have signed my name to this specification in the presence of two subscribing witnesses.

OKEY J. JACKSON.

Witnesses:
 ADDIE HINES,
 M. C. LONG.

Copies of this patent may be obtained for five cents each, by addressing the "Commissioner of Patents, Washington, D. C."